United States Patent
Kim et al.

(10) Patent No.: US 9,673,610 B2
(45) Date of Patent: Jun. 6, 2017

(54) APPARATUS AND METHOD FOR CONTROLLING ADAPTIVE RECLOSING BASED ON TRANSIENT STABILITY

(71) Applicant: Research & Business Foundation SUNGKYUNKWAN UNIVERSITY, Suwon-si (KR)

(72) Inventors: Chul Hwan Kim, Seoul (KR); Gi Hyeon Gwon, Suwon-si (KR); Yun Sik Oh, Suwon-si (KR); Ji Kyung Park, Suwon-si (KR); Gyu Jung Cho, Gwangmyeong-si (KR); Seung Hyun Sohn, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 278 days.

(21) Appl. No.: 14/630,336

(22) Filed: Feb. 24, 2015

(65) Prior Publication Data

US 2015/0263506 A1    Sep. 17, 2015

(30) Foreign Application Priority Data

Mar. 11, 2014   (KR) .................. 10-2014-0028630

(51) Int. Cl.
*H02H 3/38* (2006.01)
*H02H 3/06* (2006.01)

(52) U.S. Cl.
CPC .................. *H02H 3/066* (2013.01)

(58) Field of Classification Search
CPC ....................................... H02H 3/066
USPC ............................................ 361/60
See application file for complete search history.

(56) References Cited

U.S. PATENT DOCUMENTS

| | | | |
|---|---|---|---|
| 2004/0027747 A1* | 2/2004 | Kim | H02H 3/06 361/59 |
| 2014/0340102 A1* | 11/2014 | Glavic | H02J 3/24 324/704 |

* cited by examiner

*Primary Examiner* — Thienvu Tran
*Assistant Examiner* — Kevin J Comber
(74) *Attorney, Agent, or Firm* — NSIP Law (57) ABSTRACT

An apparatus and method for controlling adaptive reclosing based on transient stability of a power transmission line are disclosed. The apparatus includes a power angle calculation unit, an integral square error (ISE) second-order differential calculation unit, a stability determination unit, and a disconnection signal generation unit. The power angle calculation unit acquires the instantaneous value of a power angle based on voltage and phase angle measurement signals. The ISE second-order differential calculation unit acquires the instantaneous value of the second-order differential of the ISE of the power angle. The stability determination unit determines whether a system is stable or unstable based on the transitions in the instantaneous value of the second-order differential of the ISE. The disconnection signal generation unit generates a first disconnection signal and a second disconnection signal adapted to open or reclose the circuit breaker at the leader end and the circuit breaker at the follower end.

24 Claims, 4 Drawing Sheets

APPARATUS AND METHOD FOR CONTROLLING ADAPTIVE RECLOSING BASED ON TRANSIENT STABILITY

CROSS-REFERENCE TO RELATED APPLICATIONS

This application claims the benefit under 35 U.S.C. §119(a) of Korean Patent Application No. 10-2014-0028630 filed on Mar. 11, 2014, in the Korean Intellectual Property Office, the entire disclosure of which is incorporated herein by reference for all purposes.

BACKGROUND

1. Technical Field

The present invention relates generally to transmission system technology and, more particularly, to transmission system reclosing technology.

2. Description of the Related Art

Auto-reclosing is an economic and effective method that can improve the stability of a power system and the reliability of power supply.

In particular, since most faults occurring on a power transmission line are transient faults, it is important to rapidly restore a power system through a tripping operation and a reclosing operation.

Meanwhile, the result of auto-reclosing may be completely different depending on whether an occurring fault is a transient fault or a permanent fault.

That is, if auto-reclosing is performed when a transient fault has occurred, the stability of a system and the reliability of power supply can be improved. In contrast, auto-reclosing that is performed when a permanent fault has occurred may degrade the stability of the system and cause serious damage to expensive equipment inside the system.

Accordingly, although the discernment between a permanent fault and a transient fault is very important to the performance of auto-reclosing, research into this has not been sufficiently carried out.

Commonly used auto-reclosing methods include a single-phase auto-reclosing method and a three-phase auto-reclosing method.

The single-phase auto-reclosing method is a method that disconnects only a fault line when a single-line ground fault has occurred and recloses the line after a specific dead time. In the case of Korean domestic 345 kV transmission systems, most systems are designed to have a dead time of 36 cycles upon single-phase reclosing.

The three-phase auto-reclosing method is a method that performs three-phase tripping for all faults, except a single-line ground fault, in the case of, for example, a 345 kV transmission system or three-phase tripping for all faults regardless of the type of faults in the case of, for example, a 154 kV transmission system and then automatically performs reclosing after a predetermined fixed dead time. In the case of Korean domestic 345 kV transmission systems, most systems are designed to have a dead time of 48 cycles upon three-phase reclosing. 154 kV transmission systems are designed to have a dead time of 18 cycles upon three-phase reclosing.

Since these reclosing methods having a fixed dead time perform a reclosing operation when the state of a system is still unstable, they may exert an adverse influence on the system. Furthermore, a problem arises in that a dead time of tens of cycles must have elapsed even in the case where the state of the system has been stabilized immediately after tripping.

Accordingly, it is necessary to adaptively adjust the time at which a reclosing operation will be performed based on the stable state of a transient interval after tripping.

A conventional equal area criterion (EAC) method proposed as a transient stability assessment technique is suitable for a single machine infinite bus model, but has limited applications to actual transmission systems.

Meanwhile, integral square error (ISE) is used as an index related to the transient stability assessment. ISE may be used to assess the transient stability of a corresponding system after a reclosing operation has been performed. For example, the system may be viewed as being stable if the ISE converges to a specific value given in the corresponding system or converges to a rectilinear line having a specific slope, and may be viewed as being unstable if the ISE diverges.

However, since the reference of an ISE waveform that is used to determine whether a system in a tripped state is stable or unstable is ambiguous in the case where the ISE is used as an index for evaluating transient stability before a reclosing operation, it is not easy to determine the time at which a reclosing operation will be performed based on the ISE.

SUMMARY

At least one embodiment of the present invention is directed to the provision of an apparatus and method for controlling adaptive reclosing based on transient stability.

At least one embodiment of the present invention is directed to the provision of an apparatus and method for controlling adaptive reclosing based on transient stability, which determine transient stability based on an index that can be simply calculated and then control adaptive reclosing based on the determined transient stability.

At least one embodiment of the present invention is directed to the provision of an apparatus and method for controlling adaptive reclosing based on transient stability, which can distinguish transient and permanent faults from each other.

At least one embodiment of the present invention is directed to the provision of an apparatus and method for controlling adaptive reclosing based on transient stability, which can determine an optimum reclosing time point in the case of a transient fault and do not perform a reclosing operation in the case of a permanent fault.

In accordance with an aspect of the present invention, there is provided a method of controlling adaptive reclosing based on the transient stability of a power transmission line connected to a first bus via a circuit breaker at the leader end and connected to a second bus via a circuit breaker at the follower end, the method including, when a fault has occurred on the power transmission line and the circuit breaker at the leader end and the circuit breaker at the follower end are opened, acquiring the instantaneous value of a power angle based on voltage and phase angle measurement signals measured from the first bus, the second bus and the power transmission line; acquiring the instantaneous value of the second-order differential of the integral square error (ISE) of the power angle based on the instantaneous value of the power angle; and determining whether a system is stable or unstable based on a transitions in the instantaneous value of the second-order differential of the ISE.

Determining whether the system is stable or unstable based on the transitions in the instantaneous value of the second-order differential of the ISE may include, if a stable state of the instantaneous value of the second-order differential of the ISE is maintained for a first set time period, determining that the system is stable; and, if the instantaneous value of the second-order differential of the ISE is not in a stable state after a second set time period not shorter than the first set time period, determining that the system is unstable.

The stable state of the instantaneous value of the second-order differential of the ISE may be determined by comparing the instantaneous value of the second-order differential of the ISE with a first threshold value.

The method may further include, if the system is determined stable, simultaneously reclosing the circuit breaker at the leader end and the circuit breaker at the follower end; and, if the system is determined unstable, continuing to disconnect the circuit breaker at the leader end and the circuit breaker at the follower end.

The method may further include, if the system is determined stable, reclosing the circuit breaker at the leader end; immediately after the reclosing of the circuit breaker at the leader end, acquiring the instantaneous value of the second-order differential of the ISE of the power angle based on the instantaneous value of the power angle; and determining whether the fault is a transient fault or a permanent fault based on the instantaneous value of the second-order differential of the ISE.

Determining whether the fault is a transient fault or a permanent fault based on the instantaneous value of the second-order differential of the ISE may include determining whether the fault is a transient fault by comparing a maximum value of instantaneous values of second-order differentials of ISEs, acquired immediately after the reclosing of the circuit breaker at the leader end and until an end of a third set time period, with a second threshold value; and, if the fault is not determined transient for the third set time period, determining the fault to be permanent.

The method may further include, if fault is determined transient for the third set time period, reclosing the circuit breaker at the follower end.

The method may further include, if fault is determined permanent for the third set time period, locking out the circuit breaker at the leader end and the circuit breaker at the follower end.

The method may further include, if the system is determined stable, reclosing the circuit breaker at the leader end; immediately after the reclosing of the circuit breaker at the leader end, acquiring the instantaneous value of the second-order differential of the ISE of the power angle based on the instantaneous value of the power angle; if the stable state of the instantaneous value of the second-order differential of the ISE is maintained for a fourth set time period immediately after the reclosing of the circuit breaker at the leader end, determining that the fault is a transient fault; and, if the fault is not determined transient for the fourth set time period, determining that the fault is a permanent fault.

In accordance with another aspect of the present invention, there is provided a computer-readable storage medium having stored therein a computer program that is implemented to perform the method.

In accordance with still another aspect of the present invention, there is provided an apparatus for controlling adaptive reclosing based on the transient stability of a power transmission line connected to a first bus via a circuit breaker at the leader end and connected to a second bus via a circuit breaker at the follower end, the apparatus including a power angle calculation unit configured to, when a fault has occurred on the power transmission line and the circuit breaker at the leader end and the circuit breaker at the follower end are opened, acquire the instantaneous value of a power angle based on voltage and phase angle measurement signals measured from the first bus, the second bus and the power transmission line; an ISE second-order differential calculation unit configured to acquire the instantaneous value of the second-order differential of the ISE of the power angle based on the instantaneous value of the power angle; a stability determination unit configured to determine whether a system is stable or unstable based on a transitions in the instantaneous value of the second-order differential of the ISE; and a disconnection signal generation unit configured to generate a first disconnection signal and a second disconnection signal adapted to open or reclose the circuit breaker at the leader end and the circuit breaker at the follower end based on a result of the determination of the stability determination unit.

The stability determination unit may be operated to, if a stable state of the instantaneous value of the second-order differential of the ISE is maintained for a first set time period, determine that the system is stable; and if the instantaneous value of the second-order differential of the ISE is not in a stable state after a second set time period not shorter than the first set time period, determine that the system is unstable.

The stable state of the instantaneous value of the second-order differential of the ISE may be determined by comparing the instantaneous value of the second-order differential of the ISE with a first threshold value.

The disconnection signal generation unit may be operated to generate the first and second disconnection signals in order to simultaneously reclose the circuit breaker at the leader end and the circuit breaker at the follower end if the system is determined stable and to continue to disconnect the circuit breaker at the leader end and the circuit breaker at the follower end if the system is determined unstable.

The ISE second-order differential calculation unit may be operated to acquire the instantaneous value of the second-order differential of the ISE of the power angle based on the instantaneous value of the power angle immediately after the reclosing of the circuit breaker at the leader end if the system is determined stable and the circuit breaker at the leader end is reclosed; and the stability determination unit may determine whether the fault is a transient fault or a permanent fault based on the instantaneous value of the second-order differential of the ISE.

The stability determination unit may be operated to determine whether the fault is a transient fault by comparing a maximum value of instantaneous values of second-order differentials of ISEs, acquired immediately after the reclosing of the circuit breaker at the leader end and until an end of a third set time period, with a second threshold value, and to determine the fault to be a permanent fault if the fault is not determined transient for the third set time period.

The disconnection signal generation unit may be operated to generate the second disconnection signal adapted to reclose the circuit breaker at the follower end if the fault is determined transient for the third set time period.

The disconnection signal generation unit may be operated to generate the first and second disconnection signals adapted to lock out the circuit breaker at the leader end and the circuit breaker at the follower end if the fault is determined permanent for the third set time period.

The ISE second-order differential calculation unit may be operated to acquire the instantaneous value of the second-order differential of the ISE of the power angle based on the instantaneous value of the power angle immediately after the reclosing of the circuit breaker at the leader end if the system is determined stable and the circuit breaker at the leader end is reclosed; and the stability determination unit may be operated to determine that the fault is a transient fault if the stable state of the instantaneous value of the second-order differential of the ISE is maintained for a fourth set time period immediately after the reclosing of the circuit breaker at the leader end, and to determine the fault to be permanent if the fault is not determined transient for the fourth set time period.

In accordance with still another aspect of the present invention, there is provided a computer-readable storage medium having stored therein a computer program that is implemented to be executed by the apparatus.

In accordance with still another aspect of the present invention, there is provided a power transmission line system, including a power transmission line connected to a first bus via a circuit breaker at the leader end configured to be selectively opened and closed in response to a first disconnection signal and connected to a second bus via a circuit breaker at the follower end configured to be selectively opened and closed in response to a second disconnection signal; and a reclosing control apparatus configured to determine whether the power transmission line is stable or unstable after opening of the circuit breaker at the leader end, and to generate the first and second disconnection signals adapted to continue to open or reclose the circuit breaker at the leader end and the circuit breaker at the follower end based on a result of the determination; wherein the reclosing control apparatus is operated to, when a fault has occurred on the power transmission line and the circuit breaker at the leader end and the circuit breaker at the follower end are opened, acquire an instantaneous value of a power angle based on voltage and phase angle measurement signals measured from the first bus, the second bus and the power transmission line; acquire an instantaneous value of a second-order differential of an ISE of the power angle based on the instantaneous value of the power angle; determine whether a system is stable or unstable based on a transitions in the instantaneous value of the second-order differential of the ISE; and generate a first disconnection signal and a second disconnection signal adapted to open or reclose the circuit breaker at the leader end and the circuit breaker at the follower end based on a result of the determination of the stability determination unit.

The reclosing control apparatus may be operated to, if a stable state of the instantaneous value of the second-order differential of the ISE is maintained for a first set time period, determine that the system is stable; and, if the instantaneous value of the second-order differential of the ISE is not in a stable state after a second set time period not shorter than the first set time period, determine that the system is unstable.

The reclosing control apparatus may be operated to, if the system is determined stable and the circuit breaker at the leader end is reclosed, determine whether the fault is a transient fault by comparing a maximum value of instantaneous values of second-order differentials of ISEs, acquired immediately after the reclosing of the circuit breaker at the leader end and until an end of a third set time period, with a second threshold value, and determine that the fault is permanent if the fault is not determined transient for the third set time period.

The reclosing control apparatus may be operated to, if the system is determined stable and the circuit breaker at the leader end is reclosed, determine that the fault is a transient fault if the stable state of the instantaneous value of the second-order differential of the ISE is maintained for a fourth set time period, and determine that the fault is permanent if the fault is not determined transient for the fourth set time period.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and redundant descriptions of the same components will be omitted.

Figure 1:
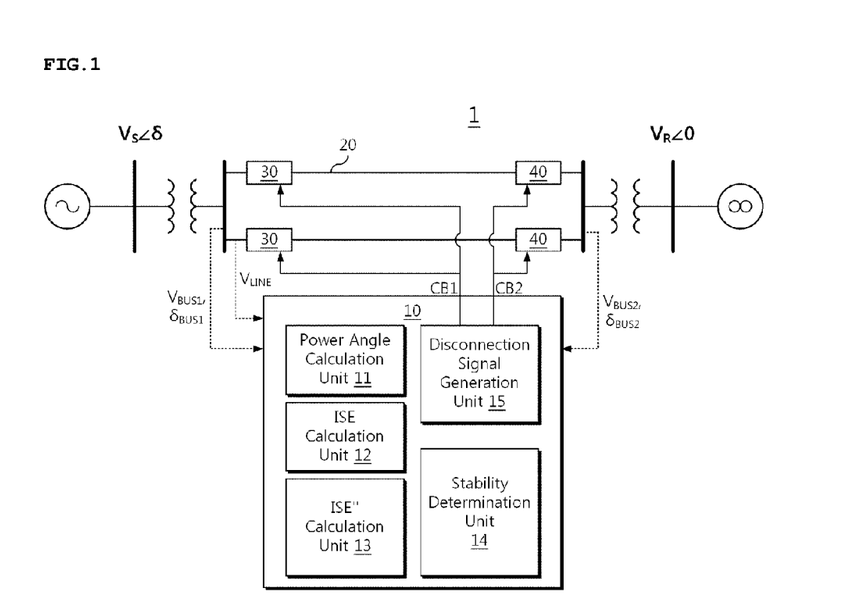
FIG. 1 is a conceptual diagram of an apparatus for controlling adaptive reclosing based on transient stability according to an embodiment of the present invention.

FIG. 1 is a conceptual diagram of an apparatus for controlling adaptive reclosing based on transient stability according to an embodiment of the present invention.

A transmission system 1 may include a reclosing apparatus 10, power transmission lines 20, leader circuit breakers 30, and follower circuit breakers 40.

The reclosing apparatus 10 determines whether a fault occurring on the power transmission lines 20 is a transient fault or a permanent fault, and operates the leader circuit breakers 30 and the follower circuit breakers 40 based on the result of the determination.

Each of the leader circuit breakers 30 and a corresponding circuit breaker 40 are connected in series in each of the power transmission lines 20.

The power transmission lines 20 are connected to a first bus BUS1 and a generator via the leader circuit breakers 30, and are connected to a second bus BUS2 and a system via the follower circuit breakers 40.

Accordingly, the power transmission lines 20 are connected or disconnected to or from the first bus BUS1 and the generator by the leader circuit breaker 30, and are connected or disconnected to and from the second bus BUS2 and the system by the follower circuit breakers 40.

Specifically, the reclosing apparatus 10 generates a first disconnection signal CB1 and a second disconnection signal CB2 that control the switching operation of the leader circuit breakers 30 and the follower circuit breakers 40 in order to open and reclose the power transmission line 20.

More specifically, first, the reclosing apparatus 10 may receive measurement signals $V_{BUS1}$, $\delta_{BUS1}$, $V_{BUS2}$, $\delta_{BUS2}$ and $V_{LINE}$ that measure the voltages and phase angles of the first bus BUS1, the second bus BUS2 and the power transmission lines 20, and may determine whether a fault has occurred on the power transmission lines 20.

If a fault has occurred on the power transmission lines 20, the reclosing apparatus 10 immediately activate the first disconnection signal CB1 and the second disconnection signal CB2 and close the leader circuit breaker 30 and the follower circuit breaker 40, thereby disconnecting the power transmission lines 20 from the first bus BUS1 and the second bus BUS2.

The principal causes of faults occurring on a power transmission line include a single-line-to-ground fault, i.e., a phenomenon in which one of three-phase lines is short-circuited to the ground, unbalanced load, the operation of a transformer, the operation of converter and a capacitor switching, and capacitor switching.

All faults except a physical defect occurring on a transmission line itself are transient faults attributable to the temporary disturbance of voltage to current, and normally disappear when the transmission line is disconnected. In this case, the determination of the cause of a fault and the elimination of the cause of the fault are issues separate from the issues of the present invention, and thus are not addressed herein.

Thereafter, in order to determine whether the cause of the fault has been eliminated and thus reclosing can be performed, the reclosing apparatus 10 receives voltage and phase angle measurement signals $V_{BUS1}$, $\delta_{BUS1}$, $V_{BUS2}$, $\delta_{BUS2}$ and $V_{LINE}$ measured from the first bus BUS1, the second bus BUS2 and the power transmission lines 20, and acquires the instantaneous value $\delta(t)$ of the power angle $\delta$ defined by Equation 1 below:

$$P = \frac{|V_S||V_R|}{X_{line}}\sin\delta \quad (1)$$

where P is active power, $V_S$ is sending-end voltage, $V_P$ is receiving-end voltage, $X_{line}$ is line impedance, and $\delta$ is a power angle.

For example, the instantaneous value $\delta(t)$ of the power angle is discretely sampled and acquired at predetermined sampling intervals. Unless described otherwise, all numerical values and values described in connection with the present invention may be processed as discrete data.

Thereafter, the reclosing apparatus 10 acquires the instantaneous value of the second-order differential integral square error ISE" of an ISE, calculated as in Equation 3, with respect to the ISE of the power angle defined by Equation 2, based on the instantaneous value $\delta(t)$ of the power angle:

$$ISE = \int_{t_{clear}}^{\infty} [\delta(t) - \delta_0]^2 dt \quad (2)$$

where $\delta_0$ is a reference power angle, and $t_{clear}$ is the time at which the fault has been eliminated by the operation of the circuit breakers and the opening of the line. The ISE is a performance index used to evaluate the performance of a system, and is acquired by integrating the square of an error between a reference value and a target value.

In general, the ISE converges when a system is stable, and diverges when a system is unstable. Since the ISE converges rapidly in proportion to the stability of a system, the relative stabilities different systems may be evaluated based on the ISE. However, the ISE is not suitable for the determination of whether to be suitable for reclosing after trip because a convergence value varies depending on system conditions.

$$ISE_n'' = (ISE_n' - ISE_{n-j}') \times 1/T_S = [ \quad (3)$$
$$(ISE_n - ISE_{n-j}) \times 1/T_S - (ISE_{n-j} - ISE_{n-2j}) \times 1/T_S] \times 1/T_S =$$
$$(ISE_n - 2ISE_{n-j} + ISE_{n-2j}) \times 1/T_S^2 \text{ where } ISE_n'' =$$
$$(ISE_n - ISE_{n-j}) \times 1/T_S$$

where n is the index of an ISE sample, j is the size of the window, and $T_S$ is the time interval between ISE samples.

As can be seen from Equation 3, the second-order differential ISE" of the ISE may be simply calculated by the four fundamental arithmetic operations of discretely sampled ISE instantaneous values. As the instantaneous value of the second-order differential ISE" is acquired, the reclosing apparatus 10 determines that the fault of the power transmission lines is a transient fault or a permanent fault based on the transitions in the instantaneous value of the second-order differential ISE".

Figure 2:
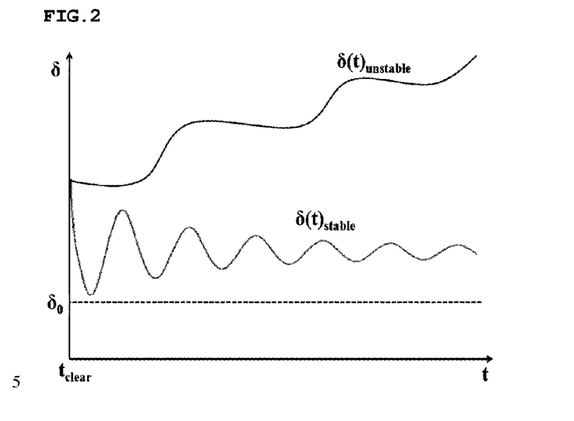
FIG. 2 is a graph of instantaneous changes in the power angle before and after adaptive reclosing according to an embodiment of the present invention.
Figure 3:
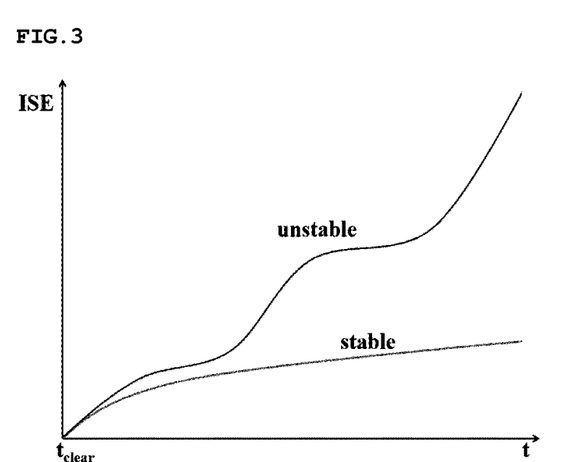
FIG. 3 is a graph of instantaneous changes in the ISE before and after adaptive reclosing according to an embodiment of the present invention.
Figure 4:
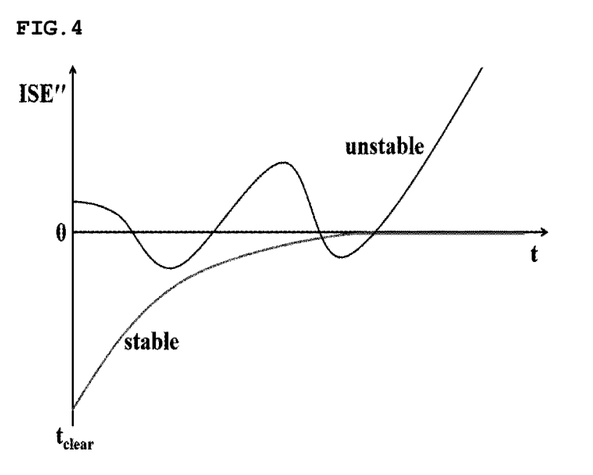
FIG. 4 is a graph of instantaneous changes in the second-order differential of the ISE before and after adaptive reclosing according to an embodiment of the present invention.

Meanwhile, reference may be made to FIGS. 2 to 4 in order to describe the relationships between the second-order differential ISE" of the ISE and system stability or unstability.

FIGS. 2 to 4 are graphs illustrating instantaneous changes in the power angle, the ISE and the second-order differential of the ISE before and after adaptive reclosing according to an embodiment of the present invention.

In FIG. 2, the power angles $\delta$ converge to a certain value when the fault has been eliminated and the system has been stabilized, and diverge when the system is made increasingly unstable by the fault.

In FIG. 3, the ISE approximates to a rectilinear line having a specific slope when the fault has been eliminated and the system has been stabilized, and diverge when the system is made increasingly unstable by the fault.

In FIG. 4, the second-order differentials ISE" of the ISE converge to 0 when the fault has been eliminated and the system has been stabilized, and diverge when the system is made increasingly unstable by the fault. In particular, in FIG. 4, when observation time is short, the second-order differentials of the ISE appear to approximate to 0 even in the case of being unstable. However, as observation time becomes longer, the unstable curve of the ISE second-order differentials is clearly distinguished from the stable curve of the ISE second-order differentials.

Unlike ISE for which a value to which the ISE converges in a stabilized system may vary depending on the system, the second-order differentials ISE" of the ISE can be used to assess the transient stability for systems having various configurations and various fault states based on whether they converge to 0 or not. Furthermore, the transient stability of the system can be evaluated by using the power angle without a need to analyze the cause of the fault.

From this point of view, more specifically, the reclosing apparatus 10 according to an embodiment of the present invention may determine that the system is stabile if the stable state of the instantaneous value of the second-order differential ISE" of the ISE is maintained for a predetermined first set time period $t_1$. In this case, the first set time period $t_1$ may be counted after the instantaneous value of the second-order differential ISE" of the ISE has entered a stable state.

In an embodiment, the instantaneous value of the second-order differential ISE" of the ISE is determined to be in a stable state if the instantaneous value of the second-order differential ISE" of the ISE does not exceed a first threshold value $\epsilon_1$ when the instantaneous value of the second-order differential ISE" of the ISE is compared with the first threshold value $\epsilon_1$, as show in Equation 4 below:

$$|ISE''| \leq 0 + \epsilon_1 \quad (4)$$

where $\epsilon_1$ is the first threshold value that is used to determine the stability of the system based on the instantaneous value of the second-order differential ISE" of the ISE.

If the instantaneous value of the second-order differential ISE" of the ISE is lower than or equal to the first threshold value $\epsilon_1$ for the first set time period $t_1$, the system may be determined stable. Since the system is determined stable, all the leader circuit breaker 30 and the follower circuit breaker 40 or at least the leader circuit breaker 30 may be immediately reclosed, rather than waiting, for example, for 48 cycles, in a conventional uniform manner. From another point of view, the reclosing apparatus 10 of the present invention may be viewed as waiting for the stability of the system and performing reclosing immediately after the system has been determined stable.

In contrast, when a stable state is not maintained for the first set time period $t_1$ and the magnitude of the ISE second-order differential ISE" increases above the first threshold value $\epsilon_1$ after the instantaneous value of the second-order differential ISE" of the ISE has temporarily been in a stable state, the system may be viewed as being still unstable because the fault has not been eliminated or the aftermath of the fault remains.

In an embodiment, if the instantaneous value of the second-order differential ISE" of the ISE exceeds the first threshold value $\epsilon_1$ once or a predetermined or larger number of times, the reclosing apparatus 10 determines that the instantaneous value of the second-order differential ISE" of the ISE is in a unstable state, but may observe the instantaneous value of the second-order differential ISE" of the ISE for a longer period, for example, until the end of a second set time period $t_2$ or until a time point after the second set time period $t_2$, rather than immediately determining whether the system is unstable.

Accordingly, the reclosing apparatus 10 may determine that the system is unstable if the instantaneous value of the second-order differential ISE" of the ISE is not in a stable state after the second set time period $t_2$. In this case, the second set time period $t_2$ may be set to a period longer than the first set time period $t_1$. Furthermore, the second set time period $t_2$ may be counted, for example, immediately after a disconnection based on the occurrence of a fault or immediately after the elimination of a fault.

In other words, the reclosing apparatus 10 may determine that the system is unstable if the time for which the instantaneous value of the second-order differential ISE" of the ISE has been maintained in a stable state is shorter than the first set time period $t_1$ and the time at which a stable state was observed occurred after the second set time period $t_2$.

According to the result of the determination, i.e., system stability or system unstability, the reclosing apparatus 10 recloses or continues to disconnect the leader circuit breaker 30 and the follower circuit breaker 40.

In an embodiment, the reclosing apparatus 10 simultaneously recloses the leader circuit breaker 30 and the follower circuit breaker 40 if the system is determined stable, and continues to disconnect, i.e., locks out, the leader circuit breaker 30 and the follower circuit breaker 40 if the system determined unstable.

Meanwhile, in another embodiment, if the system is determined stable, the reclosing apparatus 10 recloses the leader circuit breaker 30 first, observes the stable state of a corresponding line again, determines whether a fault is transient or permanent, and additionally recloses the follower circuit breaker 40 if the fault is transient, or disconnects the leader circuit breaker 30 again and continues to disconnect, i.e., locks out, the follower circuit breaker 40 if the fault is determined permanent.

In this embodiment, the reclosing apparatus 10 acquires the instantaneous value of the second-order differential ISE" of the ISE based on the instantaneous value $\delta(t)$ of the power angle during a period immediately after the determination of system stability and the reclosing of the leader circuit breaker 30 until the end of a third set time period $t_3$.

The reclosing apparatus 10 may determine whether a fault is transient or permanent by comparing the maximum value of the instantaneous values of the second-order differentials ISE" of the ISEs acquired until the end of the third set time period $t_3$, i.e., Max(ISE"), with a second threshold value $\epsilon_2$.

More specifically, the reclosing apparatus 10 may determine that the fault is transient if the maximum value of the instantaneous values of the second-order differentials ISE" of the ISEs acquired until the end of the third set time period $t_3$, i.e., Max(ISE"), is smaller than or equal to the second threshold value $\epsilon_2$.

Furthermore, the reclosing apparatus 10 may determine that the fault is permanent if the maximum value of the instantaneous values of the second-order differentials ISE" of the ISEs acquired until the end of the third set time period $t_3$, i.e., Max(ISE"), is larger than the second threshold value $\epsilon_2$.

Meanwhile, the third set time period $t_3$ may be set to a period shorter than the first set time period $t_1$ or the second set time period $t_2$, for example, about a single period of the fluctuation of the second-order differentials ISE" of the ISE.

The reclosing apparatus 10 may completely recover the connection state of the power transmission line 20 by reclosing the follower circuit breaker 40 If the fault is transient, and disconnects the leader circuit breaker 30 again and continues to disconnect, i.e., locks out, the follower circuit breaker 40 if the fault is determined permanent.

This embodiment is different from the previous case where system stability is determined based on the time for which a stable state is maintained time in order to reclose the leader circuit breaker 30 in that the determination is made based on the maximum value in order to reclose the follower circuit breaker 40. In case where the system has been determined stable anyway but the actual reason of tripping was a permanent fault, because the leader circuit breaker 30 has been already reclosed and the power transmission line 20 is connected to a generator side, if the leader circuit breaker 30 maintain connection in order to perform additional observation, short circuit current flows into a fault point and thus may incur damage. Furthermore, since an already stabilized ISE" value has further converged at the time at which the leader circuit breaker 30 is reclosed if the actual cause is a transient fault and the ISE" value having appeared to be stable during the first time $t_1$ diverges again if the cause is a permanent fault, the difference therebetween can be easily identified.

Accordingly, in this embodiment, whether the fault is transient or permanent is determined based on the maximum value of the second-order differentials ISE" of the ISE until the end of the third set time period $t_3$ shorter than the first set time period $t_1$ or the second set time period $t_2$ that is used to determine a stable state.

In contrast, in an embodiment, the reclosing apparatus 10 may determine that the fault is transient if the stable state of the instantaneous value of the second-order differential ISE" of the ISE is maintained for a predetermined fourth set time period $t_1$ and determine that the fault is permanent if not, rather than performing determination using the maximum value of the instantaneous values of the second-order differentials ISE" of the ISEs acquired until the end of the third set time period $t_3$, that is, Max(ISE"), as in the primary determination.

According to these embodiments, the reclosing apparatus 10 may include a power angle calculation unit 11, an ISE calculation unit 12, an ISE second-order differential calculation unit 13, a stability determination unit 14, and a disconnection signal generation unit 15.

The power angle calculation unit 11 receives voltage and phase angle measurement signals $V_{BUS1}$, $\delta_{BUS1}$, $V_{BUS2}$, $V_{BUS2}$ and $V_{LINE}$ measured from the first bus BUS1, the second bus BUS2 and the power transmission lines 20, and acquires the instantaneous value $\delta(t)$ of the power angle $\delta$.

The ISE calculation unit 12 may calculate an ISE by integrating the square of the error between the instantaneous value $\delta(t)$ and the reference power angle $\delta_0$ based on the acquired instantaneous value $\delta(t)$ of the power angle.

The ISE second-order differential calculation unit 13 may calculate the second-order differential ISE" of the ISE by calculating the first-order differentials ISE' of two successive ISE sample values and calculating the second-order differentials of the successive first-order differentials ISE'.

The stability determination unit 14 determines whether a system is stable or unstable based on the transitions in the instantaneous value of the second-order differential ISE", and additionally determines whether a fault of a power transmission line is transient or permanent if the system is determined stable.

More specifically, in an embodiment, the stability determination unit 14 may determine that the system is stable if the stable state of the instantaneous value of the second-order differential ISE" of the ISE is maintained for the predetermined first set time period $t_1$, and may determine that the system is unstable if it is observed after the second set time period $t_2$ longer than the first set time period $t_1$ that the instantaneous value of the second-order differential ISE" of the ISE is not in a stable state.

In an embodiment, the stable state of the instantaneous value of the second-order differential ISE" of the ISE may be determined by continuously comparing the instantaneous value of the second-order differential ISE" of the ISE with the first threshold value $\epsilon_1$.

Meanwhile, after the leader circuit breaker 30 has been reclosed because the system was determined stable, the stability determination unit 14 may additionally observe the stable state of the instantaneous value of the second-order differential ISE" of the ISE, and may determine whether a fault is transient or permanent.

In such an embodiment, immediately after the leader circuit breaker 30 has been reclosed because the system was determined stable, the stability determination unit 14 acquires the instantaneous value of the second-order differential ISE" of the ISE until the end of the third set time period $t_3$ based on the instantaneous value $\delta(t)$ of the power angle.

The stability determination unit 14 may determine whether the fault is transient or permanent by comparing the maximum value of the instantaneous values of the second-order differential ISE" of the ISEs acquired until the end of the third set time period $t_3$, i.e., Max(ISE"), with the second threshold value $\epsilon_2$.

More specifically, the stability determination unit 14 may determine that the fault is transient if the maximum value of the instantaneous values of the second-order differential ISE" of the ISEs acquired until the end of the third set time period $t_3$, i.e., Max(ISE"), is smaller than or equal to the second threshold value $\epsilon_2$.

Meanwhile, the stability determination unit 14 may determine that the fault is permanent if the maximum value of the instantaneous values of the second-order differential ISE" of the ISEs acquired until the end of the third set time period $t_3$, i.e., Max(ISE"), is larger than the second threshold value $\epsilon_2$.

In contrast, in an embodiment, the stability determination unit 14 may determine that the fault is transient if the stable state of the instantaneous value of the second-order differential ISE" of the ISE is maintained for the predetermined fourth set time period $t_4$, and may determine that the fault is permanent if not.

Based on the result of the determination of the stability determination unit 14, the disconnection signal generation unit 15 may generate first and second disconnection signals CB1 and CB2 in order to simultaneously reclose the leader circuit breaker 30 and the follower circuit breaker 40 in response to the determination that the system is stable or to reclose the leader circuit breaker 30 first in response to the determination that the system is stable and reclose the follower circuit breaker 40 in response to the determination that the fault is a transient fault, and may generate first and second disconnection signals CB1 and CB2 in order to lock out the leader circuit breaker 30 and the follower circuit breaker 40 in response to the determination that the system is unstable and the fault is a permanent fault.

Figure 5:
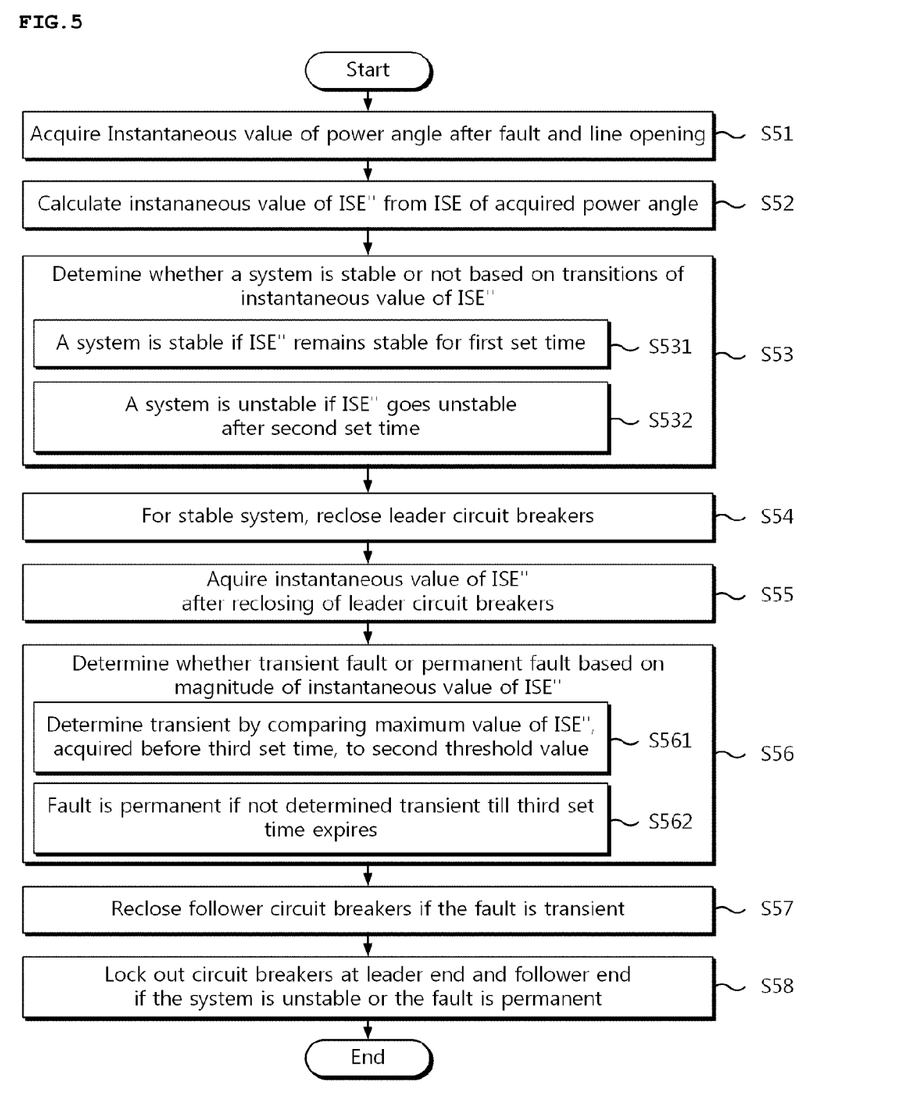
FIG. 5 is a flowchart of a method of controlling adaptive reclosing based on transient stability according to an embodiment of the present invention.

FIG. 5 is a flowchart of a method of controlling adaptive reclosing based on transient stability according to an embodiment of the present invention.

Referring to FIG. 5, the method for adaptive reclosing based on the transient stability of the power transmission line 20 that is connected to the first bus BUS1 via the leader circuit breaker 30 and is connected to the second bus BUS2 via the follower circuit breaker 40 may start with step S51 at which, when a fault occurs on the power transmission line 20, the leader circuit breaker 30 and the follower circuit breaker 40 are opened and thus the power transmission line 20 is opened, the reclosing apparatus 10 acquires the instantaneous value $\delta(t)$ of the power angle $\delta$ based on voltage and phase angle measurement signals $V_{BUS1}$, $\delta_{BUS1}$, $V_{BUS2}$, $\delta_{BUS2}$, and $V_{LINE}$ measured from the first bus BUS1, the second bus BUS2 and the power transmission line 20.

Thereafter, at step S52, the instantaneous value of the second-order differential ISE" of the ISE may be acquired based on the instantaneous value of the power angle.

Thereafter, at step S53, whether the fault is transient or permanent is determined based on the transitions in the instantaneous value of the second-order differential ISE" of the ISE.

More specifically, at step S531, if the stable state of the instantaneous value of the second-order differential ISE" of the ISE is maintained for the first set time period $t_1$, the system is determined stable.

Furthermore, at step S532, if the instantaneous value of the second-order differential ISE" of the ISE is not in a stable state after the second set time period $t_2$ not shorter than the first set time period $t_1$, the system is determined unstable.

In this case, the stable state of the instantaneous value of the second-order differential ISE" of the ISE may be determined by comparing the instantaneous value of the second-order differential ISE" of the ISEs with the first threshold value $\epsilon_1$.

In an embodiment, if, as a result of the determination at step S53, the system is determined stable, the leader circuit breaker 30 and the follower circuit breaker 40 may be simultaneously reclosed. Furthermore, if, as a result of the determination at step S53, the system is determined unstable, the leader circuit breaker 30 and the follower circuit breaker 40 may be locked out.

In an embodiment, if the system is determined stable at step 53, the determination process of steps S54 to S56 may follow.

At step S54, if the system is determined stable, the reclosing apparatus 10 may reclose the leader circuit breaker 30.

At step S55, immediately after the reclosing of the leader circuit breaker, the instantaneous value of the second-order differential ISE" of the ISE of the power angle may be acquired based on the instantaneous value of the power angle.

Furthermore, at step S56, whether the fault is transient or permanent is determined based on the instantaneous value of the second-order differential ISE" of the ISE. More specifically, at step S561, whether the fault is transient is determined by comparing the maximum value of the instantaneous values of the second-order differentials ISE" of the ISEs acquired immediately after the reclosing of the leader circuit breaker 30 until the third set time period $t_3$, i.e., Max(ISE"), with the second threshold value $\epsilon_2$.

Furthermore, at step S562, if the fault is not determined transient for the third set time period $t_3$, the fault may be determined permanent.

Thereafter, at step S57, if the fault is determined transient for the third set time period $t_3$, the follower circuit breaker 40 may be reclosed.

At step S58, if the fault is determined permanent for the third set time period $t_3$, the leader circuit breaker 30 and the follower circuit breaker 40 may be locked out.

Figure 6:
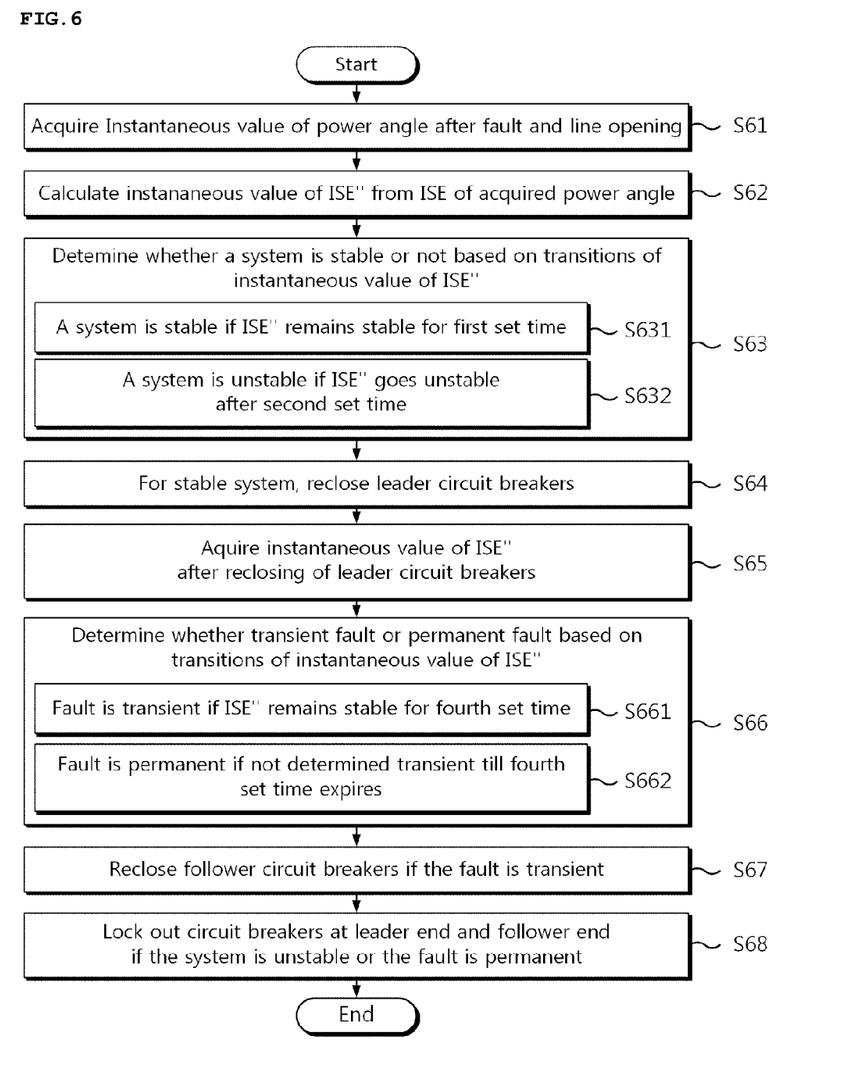
FIG. 6 is a flowchart of a method of controlling adaptive reclosing based on transient stability according to another embodiment of the present invention.

FIG. 6 is a flowchart of a method of controlling adaptive reclosing based on transient stability according to another embodiment of the present invention.

The method of controlling adaptive reclosing according to the embodiment of FIG. 6 is generally similar to the method of controlling adaptive reclosing illustrated in FIG. 5. Since steps S61 to S65 and S67 are substantially the same as steps S51 to S55 and S57 of FIG. 5, descriptions thereof are omitted. However, step S66 is somewhat different from step S56.

At step S66, whether the fault is transient or permanent may be determined based on the transitions in the instantaneous value of the second-order differential ISE" of the ISE.

More specifically, at step S661, if the stable state of the instantaneous value of the second-order differential ISE" of the ISE is maintained for the predetermined fourth set time period $t_4$, the fault may be determined transient.

Furthermore, at step S662, if the fault is not determined transient for the fourth set time period $t_4$, the fault may be determined permanent.

The apparatus and method for controlling adaptive reclosing based on transient stability have the advantage of being able to determine transient stability based on an index that can be simply calculated.

The apparatus and method for controlling adaptive reclosing based on transient stability have the advantage of being able to distinguish transient and permanent faults from each other.

The apparatus and method for controlling adaptive reclosing based on transient stability have the advantage of being able to determine an optimum reclosing time point in the case of a transient fault and prevent a reclosing operation from being performed in the case of a permanent fault.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

Furthermore, the apparatus according to at least one embodiment of the present invention may be implemented as a computer-readable code on a computer-readable storage medium. The computer-readable storage medium includes all types of storage devices on which data that can be read by a computer system is stored. Examples of the computer-readable storage medium include read-only memory (ROM), random access memory (RAM), an optical disk, a magnetic tape, a floppy disk, nonvolatile memory, etc. Furthermore, the computer-readable storage medium may be distributed across computer systems connected to each other over a network, and computer-read able code may be stored and executed in the computer systems in a distributed manner.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method of controlling adaptive reclosing based on transient stability of a power transmission line, the method comprising:
    acquiring an instantaneous value of a power angle based on voltage and phase angle measurement signals measured from a first bus connected to the power transmission line via a circuit breaker at a leader end, a second bus connected to the power transmission line via a circuit breaker at a follower end, and the power transmission line, in response to a fault occurring on the power transmission line, and in response to the circuit breaker at the leader end and the circuit breaker at the follower end being opened;
    acquiring an instantaneous value of a second-order differential of an integral square error (ISE) of the power angle based on the instantaneous value of the power angle; and determining whether a system comprising the power transmission line is stable or unstable based on transitions in the instantaneous value of the second-order differential of the ISE.

2. The method of claim 1, wherein the determining whether the system is stable or unstable comprises: determining that the system is stable, in response to a stable state of the instantaneous value of the second-order differential of the ISE being maintained for a first time period; and determining that the system is unstable, in response to the instantaneous value of the second-order differential of the ISE not being in a stable state after a second time period not shorter than the first time period.

3. The method of claim 2, wherein the stable state is determined by comparing the instantaneous value of the second-order differential of the ISE with a first threshold value.

4. The method of claim 1, further comprising:
simultaneously reclosing the circuit breaker at the leader end and the circuit breaker at the follower end, in response to the determining that the system is stable; and
continuing to disconnect the circuit breaker at the leader end and the circuit breaker at the follower end, in response to the determining that the system is unstable.

5. The method of claim 2, further comprising:
reclosing the circuit breaker at the leader end, in response to the determining that the system is stable;
acquiring the instantaneous value of the second-order differential of the ISE of the power angle based on the instantaneous value of the power angle, after the reclosing of the circuit breaker at the leader end; and
determining whether the fault is a transient fault or a permanent fault based on the instantaneous value of the second-order differential of the ISE.

6. The method of claim 5, wherein determining whether the fault is a transient fault or a permanent fault comprises:
determining whether the fault is a transient fault by comparing a maximum value of instantaneous values of second-order differentials of ISEs, acquired after the reclosing of the circuit breaker at the leader end and until an end of a third time period, with a second threshold value; and
determining that the fault is a permanent fault, in response to determining that the fault is not transient for the third time period.

7. The method of claim 6, further comprising reclosing the circuit breaker at the follower end, in response to determining that the fault is transient for the third time period.

8. The method of claim 6, further comprising locking out the circuit breaker at the leader end and the circuit breaker at the follower end, in response to determining that the fault is permanent for the third time period.

9. The method of claim 6, further comprising:
reclosing the circuit breaker at the leader end, in response to the determining that the system is stable;
acquiring the instantaneous value of the second-order differential of the ISE of the power angle based on the instantaneous value of the power angle, after the reclosing of the circuit breaker at the leader end;
determining that the fault is a transient fault, in response to the stable state remaining for a fourth time period after the reclosing of the circuit breaker at the leader end; and
determining that the fault is a permanent fault, in response to determining that the fault is not transient for the fourth time period.

10. A non-transitory computer-readable medium storing instructions that, when executed by a processor, cause the processor to perform the method of any one of claims 1 to 9.

11. An apparatus to control adaptive reclosing based on transient stability of a power transmission line, the apparatus comprising:
a power angle calculator configured to acquire an instantaneous value of a power angle based on voltage and phase angle measurement signals measured from a first bus connected to the power transmission line via a circuit breaker at a leader end, a second bus connected to the power transmission line via a circuit breaker at a follower end, and the power transmission line, in response to a fault occurring on the power transmission line, and in response to the circuit breaker at the leader end and the circuit breaker at the follower end being opened;
an ISE second-order differential calculator configured to acquire an instantaneous value of a second-order differential of an ISE of the power angle based on the instantaneous value of the power angle;
a stability determiner configured to determine whether a system comprising the power transmission line is stable or unstable based on transitions in the instantaneous value of the second-order differential of the ISE; and
a disconnection signal generator configured to generate a first disconnection signal and a second disconnection signal adapted to open or reclose the circuit breaker at the leader end and the circuit breaker at the follower end based on a result of the determining whether the system is stable or unstable.

12. The apparatus of claim 11, wherein the stability determiner is further configured to:
determine that the system is stable, in response to maintaining a stable state of the instantaneous value of the second-order differential of the ISE for a first time period; and
determine that the system is unstable, in response to the instantaneous value of the second-order differential of the ISE not being in a stable state after a second time period not shorter than the first time period.

13. The apparatus of claim 12, wherein the stable state is determined by comparing the instantaneous value of the second-order differential of the ISE with a first threshold value.

14. The apparatus of claim 11, wherein the disconnection signal generator is further configured to generate the first and second disconnection signals to simultaneously reclose the circuit breaker at the leader end and the circuit breaker at the follower end, in response to determining that the system is stable, and to continue to disconnect the circuit breaker at the leader end and the circuit breaker at the follower end, in response to determining that the system is unstable.

15. The apparatus of claim 11, wherein:
the ISE second-order differential calculator is further configured to acquire the instantaneous value of the second-order differential of the ISE of the power angle based on the instantaneous value of the power angle after the reclosing of the circuit breaker at the leader end, in response to determining that the system is stable and the circuit breaker at the leader end is reclosed; and
the stability determiner is further configured to determine whether the fault is a transient fault or a permanent fault based on the instantaneous value of the second-order differential of the ISE.

16. The apparatus of claim 12, wherein the stability determiner is further configured to:
    determine that the fault is a transient fault by comparing a maximum value of instantaneous values of second-order differentials of ISEs, acquired after the reclosing of the circuit breaker at the leader end and until an end of a third time period, with a second threshold value; and to
    determine that the fault is a permanent fault, in response to determining that the fault is not transient for the third time period.

17. The apparatus of claim 16, wherein the disconnection signal generator is further configured to generate the second disconnection signal to reclose the circuit breaker at the follower end, in response to determining that the fault is transient for the third time period.

18. The apparatus of claim 16, wherein the disconnection signal generator is further configured to generate the first and second disconnection signals to lock out the circuit breaker at the leader end and the circuit breaker at the follower end, in response to determining that the fault is permanent for the third time period.

19. The apparatus of claim 16, wherein:
    the ISE second-order differential calculator is further configured to acquire the instantaneous value of the second-order differential of the ISE of the power angle based on the instantaneous value of the power angle after the reclosing of the circuit breaker at the leader end, in response to determining that the system is stable and the circuit breaker at the leader end is reclosed; and
    the stability determiner is further configured to determine that the fault is a transient fault, in response to the stable state of the instantaneous value of the second-order differential of the ISE being maintained for a fourth time period after the reclosing of the circuit breaker at the leader end, and to determine that the fault is a permanent fault, in response to determining that the fault is not transient for the fourth time period.

20. A non-transitory computer-readable storage medium storing instructions that, when executed by a processor, cause the processor to perform any one of claims 11 to 19.

21. A power transmission line system, comprising:
    a power transmission line connected to a first bus via a circuit breaker at a leader end configured to be selectively opened and closed, in response to a first disconnection signal, and connected to a second bus via a circuit breaker at a follower end configured to be selectively opened and closed, in response to a second disconnection signal; and
    a reclosing control apparatus configured to:
        determine whether the power transmission line is stable or unstable after the circuit breaker is opened at the leader end;
        generate the first disconnection signal and the second disconnection signal to continue to open or reclose the circuit breaker at the leader end and the circuit breaker at the follower end based on a result of the determining whether the power transmission line is stable or unstable;
        acquire an instantaneous value of a power angle based on voltage and phase angle measurement signals measured from the first bus, the second bus and the power transmission line, in response to a fault occurring on the power transmission line, and in response to the circuit breaker at the leader end and the circuit breaker at the follower end being opened;
        acquire an instantaneous value of a second-order differential of an ISE of the power angle based on the instantaneous value of the power angle;
        determine whether the power transmission line system is stable or unstable based on transitions in the instantaneous value of the second-order differential of the ISE; and
        generate the first disconnection signal and the second disconnection signal to open or reclose the circuit breaker at the leader end and the circuit breaker at the follower end based on a result of the determining whether the power transmission line system is stable or unstable.

22. The power transmission line system of claim 21, wherein the reclosing control apparatus is further configured to:
    determine that the power transmission line system is stable, in response to a stable state of the instantaneous value of the second-order differential of the ISE being maintained for a first time period; and
    determine that the power transmission line system is unstable, in response to the instantaneous value of the second-order differential of the ISE not being in a stable state after a second time period shorter than the first set time period.

23. The power transmission line system of claim 22, wherein the reclosing control apparatus is further configured to:
    determine whether the fault is a transient fault by comparing a maximum value of instantaneous values of second-order differentials of ISEs, acquired after the reclosing of the circuit breaker at the leader end and until an end of a third time period, with a second threshold value, in response to determining that the power transmission line system is stable and the circuit breaker at the leader end is reclosed, and
    determine that the fault is a permanent fault, in response to determining that the fault is not transient for the third time period.

24. The power transmission line system of claim 23, wherein the reclosing control apparatus is further configured to:
    determine that the fault is a transient fault, in response to determining that the power transmission line system is in a stable state, the circuit breaker at the leader end being reclosed, and the stable state of the instantaneous value of the second-order differential of the ISE being maintained for a fourth time period, and
    determine that the fault is a permanent fault, in response to determining that the fault is not transient for the fourth time period.

* * * * *